(12) United States Patent
Tanaka et al.

(10) Patent No.: US 9,386,629 B2
(45) Date of Patent: Jul. 5, 2016

(54) WIRELESS ACCESS POINT DEVICE AND WIRELESS NETWORK SYSTEM WITH THE SAME

(71) Applicant: FURUNO Electric Company Limited, Nishinomiya (JP)

(72) Inventors: Tsutomu Tanaka, Nishinomiya (JP); Daijirou Hasegawa, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 165 days.

(21) Appl. No.: 14/288,026

(22) Filed: May 27, 2014

(65) Prior Publication Data

US 2014/0355587 A1    Dec. 4, 2014

(30) Foreign Application Priority Data

May 30, 2013   (JP) .................. 2013-114675

(51) Int. Cl.
 *H04W 4/00*    (2009.01)
 *H04W 88/08*   (2009.01)
 *H04L 12/24*   (2006.01)
 *H04L 29/06*   (2006.01)
 *H04W 12/00*   (2009.01)

(52) U.S. Cl.
 CPC ............ *H04W 88/08* (2013.01); *H04L 41/28* (2013.01); *H04L 63/20* (2013.01); *H04W 12/00* (2013.01)

(58) Field of Classification Search
 None
 See application file for complete search history.

(56) References Cited

U.S. PATENT DOCUMENTS

| 7,310,664 | B1 * | 12/2007 | Merchant et al. | 709/220 |
| 2010/0180016 | A1 * | 7/2010 | Bugwadia et al. | 709/220 |
| 2012/0284517 | A1 * | 11/2012 | Lambert | 713/169 |
| 2014/0120940 | A1 * | 5/2014 | Ren et al. | 455/454 |

FOREIGN PATENT DOCUMENTS

| JP | 2000-050359 A | 2/2000 |
| JP | 2010-118861 A | 5/2010 |
| JP | 2012-160933 A | 8/2012 |
| JP | 2012-191615 A | 10/2012 |
| JP | 2012-244585 A | 12/2012 |
| JP | 5159044 B | 3/2013 |

* cited by examiner

*Primary Examiner* — Steven H Nguyen
(74) *Attorney, Agent, or Firm* — Global IP Counselors, LLP

(57) ABSTRACT

There is provided a configuration in an access point managed by a management device for dealing with a situation in which management by the management device is no longer possible. An access point 3 includes a controller 30 that controls the operation of the access point 3, and a management status detector 32 that detects the management status by a management device 2. The controller 30 changes the operation of the access point 3 by validating or invalidating an SSID according to the detecting result of the management status.

20 Claims, 8 Drawing Sheets

MEMORY — 31

| SSID | AUTHENTICATION SETTING | COMMUNICATION FILTER | NORMAL OPERATION | MANAGEMENT INTERRUPTION FIRST STAGE | MANAGEMENT INTERRUPTION SECOND STAGE |
|---|---|---|---|---|---|
| FIRST SSID | WPA2 ENTERPRISE | COMMERCIAL COMMUNICATION NETWORK: PERMITTED INTERNET: PERMITTED | VALID | INVALID | INVALID |
| SECOND SSID | WPA2 HOME (AUTHENTICATION BY PASS-PHRASE DISCLOSED ONLY TO RESPONSIBLE PARTY) | COMMERCIAL COMMUNICATION NETWORK: PERMITTED INTERNET: PERMITTED | INVALID | VALID | VALID |
| THIRD SSID | WPA2 HOME (AUTHENTICATION BY PUBLICLY DISCLOSED PASS-PHRASE) | COMMERCIAL COMMUNICATION NETWORK: PROHIBITED INTERNET: PERMITTED | INVALID | INVALID | VALID |

FIG. 3

MEMORY

| SSID | AUTHENTICATION SETTING | COMMUNICATION FILTER | NORMAL OPERATION | MANAGEMENT DEVICE MALFUNCTION | MAJOR NETWORK ERROR | INDEPENDENT STATE |
|---|---|---|---|---|---|---|
| FIRST SSID | WPA2 ENTERPRISE | COMMERCIAL COMMUNICATION NETWORK: PERMITTED INTERNET: PERMITTED | VALID | INVALID | INVALID | INVALID |
| SECOND SSID | WPA2 HOME (AUTHENTICATION BY PASS-PHRASE DISCLOSED ONLY TO RESPONSIBLE PARTY) | COMMERCIAL COMMUNICATION NETWORK: PERMITTED INTERNET: PERMITTED | INVALID | VALID | VALID | INVALID |
| THIRD SSID | WPA2 HOME (AUTHENTICATION BY PUBLICLY DISCLOSED PASS-PHRASE) | COMMERCIAL COMMUNICATION NETWORK: PROHIBITED INTERNET: PERMITTED | INVALID | INVALID | VALID | INVALID |

*FIG. 5*

MANAGEMENT STATUS DETECTOR ← 42

| DETECTING CONDITION | DETECTING RESULT |
|---|---|
| COMMUNICATION WITH MANAGEMENT DEVICE IS IMPOSSIBLE, AND LESS THAN A SPECIFIC NUMBER OF CONFIRMATION-USE ADDRESS CANNOT BE ACCESSED | MALFUNCTION OF MANAGEMENT DEVICE |
| COMMUNICATION WITH MANAGEMENT DEVICE IS IMPOSSIBLE, AND AT LEAST A SPECIFIC NUMBER OF CONFIRMATION-USE ADDRESS CANNOT BE ACCESSED | MAJOR NETWORK ERROR |
| CONFIRMATION WITH DEFAULT GETAWAY IMPOSSIBLE | INDEPENDENT STATE |

*FIG. 6*

| SSID | AUTHENTICATION SETTING | COMMUNICATION FILTER | NORMAL OPERATION | MANAGEMENT INTERRUPTION |
|---|---|---|---|---|
| FIRST SSID | WPA2 ENTERPRISE | COMMERCIAL COMMUNICATION NETWORK: PERMITTED INTERNET: PERMITTED | VALID | INVALID |
| SECOND SSID | WPA2 HOME (AUTHENTICATION BY PASS-PHRASE DISCLOSED ONLY TO RESPONSIBLE PARTY) | COMMERCIAL COMMUNICATION NETWORK: PERMITTED INTERNET: PERMITTED | INVALID | VALID |
| THIRD SSID | WPA2 HOME (AUTHENTICATION BY PUBLICLY DISCLOSED PASS-PHRASE) | COMMERCIAL COMMUNICATION NETWORK: PROHIBITED INTERNET: PERMITTED | INVALID | VALID |

*FIG. 7*

WIRELESS ACCESS POINT DEVICE AND WIRELESS NETWORK SYSTEM WITH THE SAME

CROSS-REFERENCE TO RELATED APPLICATIONS

This application claims priority to Japanese Patent Application No. 2013-114675 filed on May 30, 2013. The entire disclosure of Japanese Patent Application No. 2013-114675 is hereby incorporated herein by reference.

BACKGROUND

1. Field of the Invention

The present invention generally relates to a wireless access point device.

2. Background Information

When using a wireless LAN or other such wireless network, many access points need to be managed. In view of this, a management device is sometimes employed to centrally manage the many access points. For instance, Japanese Patent No. 5,159,044 (Patent Literature 1) discusses an access point managed by a management device (a host communication device).

The administrator of a wireless network can use a management device to change the settings of individual access points, or to change the settings of numerous access points all at once. A management device also allows these setting changes to be made automatically as dictated by the situation. For instance, the management device discussed in Japanese Unexamined Patent Application Publication No. 2012-191615 (Patent Literature 2) is configured so that an SSID is dynamically allocated to each access point according to the network traffic.

With the above-mentioned wireless network, as long as the management device is able to properly manage each access point, that wireless network will be able to operate properly. Another advantage is that since the various access points are centrally managed by the management device, the wireless network can be operated at a higher security level.

SUMMARY

In an emergency situation, such as when some sort of large-scale disaster has occurred, it is sometimes desirable to change the configuration of the wireless network to accommodate this emergency. However, if a large-scale disaster such as this has occurred, all or part of the network will likely be cut off, making communication between the management device and the various access points impossible. In such an event, the management device will not be able to change the settings of the access points.

Also, with commercial-use access points, there are not a few models that will not start up if communication with the management device cannot be performed. An access point such as this would be utterly useless if communication with the management device were cut off in the event of a major disaster.

Also, there is the possibility that management by the management device will be interrupted by any number of causes other than a major disaster, such as not being able to operate the management device because the administrator is ill or has had an accident.

As discussed above, with a wireless network in which various access points are managed by a management device, if management by the management device should be interrupted, it is very likely that a scenario will result in which the settings of the access points cannot be changed. The present invention was conceived in light of the above situation, and it is an object thereof to provide a configuration with which a scenario in which access points managed by a management device can no longer be managed by the management device will not occur.

The problem to be solved by the present invention is as discussed above, and the means for solving this problem, and the effects thereof, will now be described.

In one aspect of the present invention, there is provided the following configuration of a wireless access point device in which authentication settings or communication settings are managed by a management device. Specifically, this wireless access point device includes a controller configured to control operation of the wireless access point device, and a management status detector configured to detect a management status by the management device. The controller is further configured to change the operation of the wireless access point device according to a detecting result of the management status.

Specifically, the wireless access point device itself detects the management status by the management device, and changes the operation autonomously according to the detecting result. Consequently, if management by the management device should become impossible due to a large-scale disaster, for example, the wireless access point device will autonomously change the operation so that it can properly accommodate a large-scale disaster or the like.

With the above-mentioned wireless access point device, it is preferable if the controller is further configured to controls at least authentication of a client terminal that has attempted to connect to the wireless access point device, and access restriction to the client terminal for which the authentication has been successful.

Consequently, the controller can vary the method for authenticating a client terminal, and the details of the access limitation to that client terminal, based on the detecting result by the management status detector. Therefore, the authentication and access limitation performed by the wireless access point device can be changed according to the management status.

With the above-mentioned wireless access point device, it is preferable if the controller is further configured to make the wireless access point device publicly available according to the detecting result of the management status.

For example, when it is detected that management by the management device has been interrupted in the event of a large-scale disaster, etc., the wireless access point device is made publicly available so that this wireless access point device can be utilized as communication infrastructure in an emergency.

The above-mentioned wireless access point device is preferably configured as follows. Specifically, the management status detector is further configured to detect the management status in a plurality of stages. The controller is further configured to change the operation for each of the plurality of stages.

Because the operation of the wireless access point device is thus varied in a plurality of stages according to the detecting result of the management status, the wireless access point device can be properly operated as dictated by the situation.

The above-mentioned wireless access point device is preferably configured as follows. Specifically, the management status detector is further configured to detect the management status by the management device in at least the following two stages, namely, the length of time that management has been interrupted is less than a specific duration, and the length of time that management has been interrupted is at least the specific duration.

Consequently, if management by the management device should be interrupted, the operation of the wireless access point device can be changed according to whether or not a specific length of time has elapsed.

The above-mentioned wireless access point device can also be configured as follows. Specifically, the management status detector is further configured to detect the management status by the management device in at least the following two stages, namely, a state in which an error has occurred in a network, and a state in which an error has not occurred in the network.

Consequently, the operation of the wireless access point device can be changed according to whether or not an error has not occurred in the network.

With the above-mentioned wireless access point device, it is preferable if the management status detector is further configured to detect that management by the management device has been interrupted based on at least one of the following conditions: a situation in which there is a problem with management communication with the management device, a situation in which communication with the management device is impossible, and a situation in which an administrator has no access to the management device.

Specifically, if one of the above-mentioned conditions is met, then the wireless access point device can conclude that management by the management device has been interrupted.

With the wireless access point device, the management status detector can be further configured to detect the management status based on a state of communication with a device other than the management device.

Specifically, the state of the network can be estimated by checking the communication state with devices other than the management device, among the various devices on the network. The management status by the management device can be detected based on the network state thus estimated.

The above-mentioned wireless access point device can be configured as follows. Specifically, the management status detector is further configured to store addresses for a plurality of confirmation-use devices, which are devices other than the management device. The management status detector is further configured to detect the management status based on a number of addresses with which communication cannot be performed.

For example, if communication cannot be established with numerous confirmation-use addresses, it can be concluded that a serious error has occurred on the network. In such a case, the wireless access point device can be concluded to be in a state in which management by the management device cannot be carried out normally due to network error.

With the above-mentioned wireless access point device, it is preferable if the controller is further configured to change the operation according to the number of addresses with which communication cannot be performed.

For instance, if an error has not occurred in the network, the wireless access point device will be able to communicate with numerous confirmation-use addresses. On the other hand, if a serious error has occurred in the network, the wireless access point device will not be able to communicate with numerous confirmation-use addresses. Therefore, the proper operation for a given network situation can be performed by changing the operation of the wireless access point device based on the number of confirmation-use addresses with which communication cannot be performed.

The above-mentioned wireless access point device can be configured as follows. Specifically, a device other than the management device is a default gateway to the wireless access point device.

Specifically, if communication with the default gateway is impossible, the wireless access point device will be independent from the network. Therefore, in this happens, a state can be detected in which management cannot be performed by the management device because of independence from the network.

With the above-mentioned wireless access point device, it is preferable if the controller is further configured to cut off communication with a client device when communication with the default gateway is impossible.

Consequently, a client connected to a wireless access point device that has become independent from its network is prompted to roam, so as to connect to another wireless access point device.

With the above-mentioned wireless access point device, it is preferable if the management status detector is further configured to detect the management status when a specific operation is performed on the wireless access point device.

With this configuration, in which the management status is detected by a clear operation, there is less worry about erroneous detecting.

Another aspect of the present invention provides a wireless network system including the above-mentioned wireless access point device and the management device.

Yet another aspect of the present invention provides, as follows, a method for controlling a wireless access point device, in which authentication settings or communication settings are managed by a management device. Specifically, this control method includes a management status detecting step and an operation change step. In the management status detecting step, the management status by the management device is detected. In the operation change step, operation of the wireless access point device is changed according to a detecting result of the management status.

BRIEF DESCRIPTION OF THE DRAWINGS

Referring now to the attached drawings which form a part of this original disclosure:

FIG. 3 is a table of what is stored in a memory in the first embodiment;

FIG. 5 is a table of what is stored in the memory in a modification example of the first embodiment;

FIG. 6 is a table of the detecting conditions at the management status detector in a modification example of the first embodiment;

FIG. 7 is a table of what is stored in a memory in a second embodiment; and

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
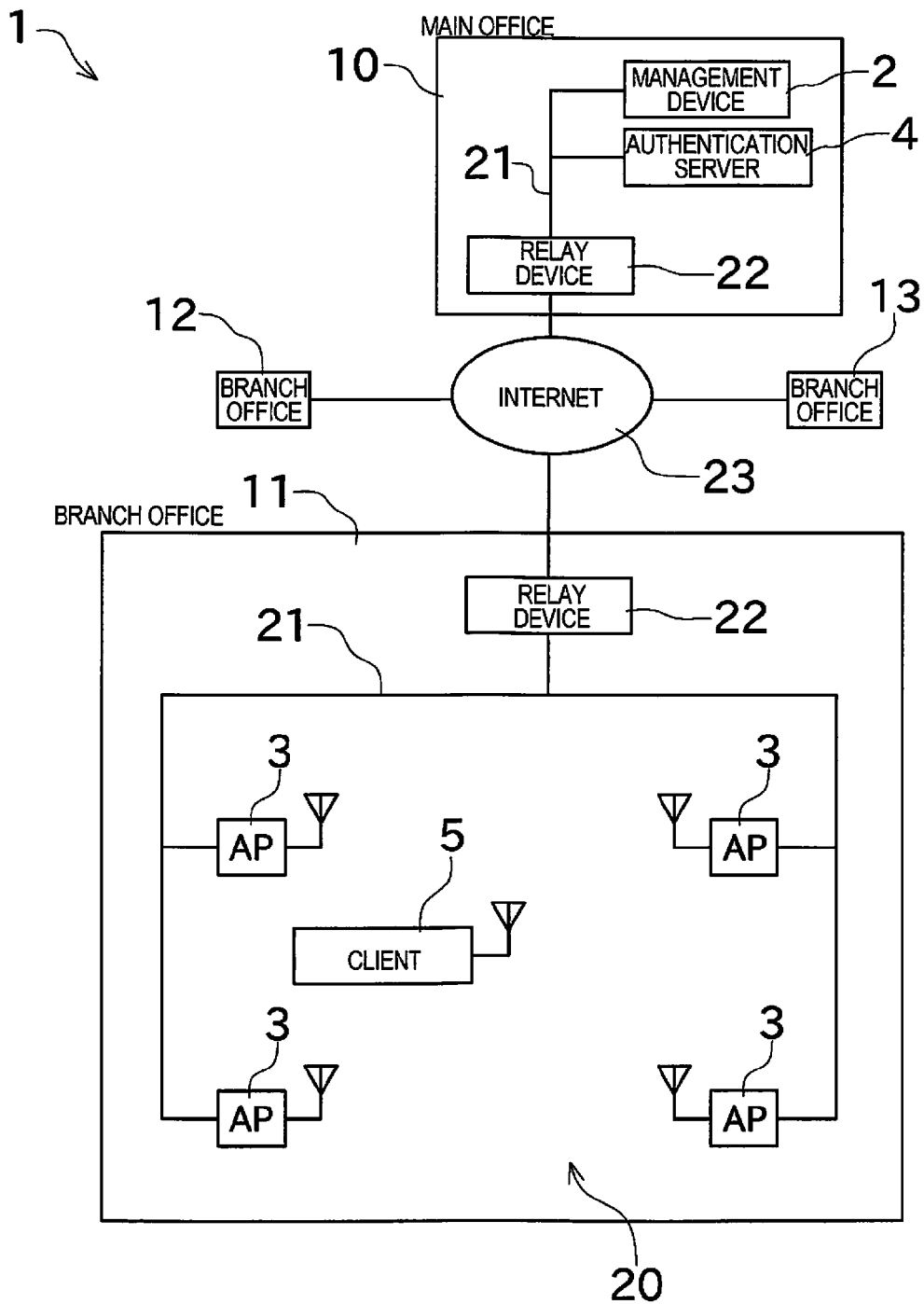
FIG. 1 is a block diagram of the overall configuration of the wireless network system pertaining to an embodiment of the present invention.

FIG. 1 is a block diagram of the overall configuration of a wireless network system 1 pertaining to an embodiment of the present invention.

Let us assume that the wireless network system 1 in this embodiment is applied to a wireless network installed at the facilities of a government office, such as a federal or local branch. The present invention, however, is not limited to this, and can also be applied to a wireless network at a company or a university.

For example, the wireless network system 1 in FIG. 1 is made up of a main office 10 and numerous branch offices 11, 12, 13, . . . that are under the authority of the main office 10. In each of the main office 10 and the branch offices 11, 12, 13, . . . is installed a wireless LAN (local area network) 20.

A plurality of wireless access point devices 3 (hereinafter referred to simply as "access points") that constitute a wireless LAN 20 are installed in the branch office 11. A wired LAN 21 is also installed in the branch office 11, and the access points 3 are connected to this wired LAN 21. This creates the wireless LAN 20 in the office. In FIG. 1, the wireless LAN 20 is illustrated by using the branch office 11 as an example, but the same wireless LAN 20 is also provided to the other branch offices 12, 13, and so forth and to the main office 10.

A client device 5 (hereinafter referred to simply as a "client") of this wireless network system 1 can communicate wirelessly with the access points 3. Usually, the client 5 is a mobile information terminal, a personal computer (PC), or the like that is used commercially by an employee of the wireless network system 1 (such as a government worker). As will be described below, however, in some cases the wireless network system 1 in this embodiment can be used by regular people other than employees. Therefore, the client 5 could also be a PC or a mobile information terminal owned by a regular person who is not an employee.

Figure 2:
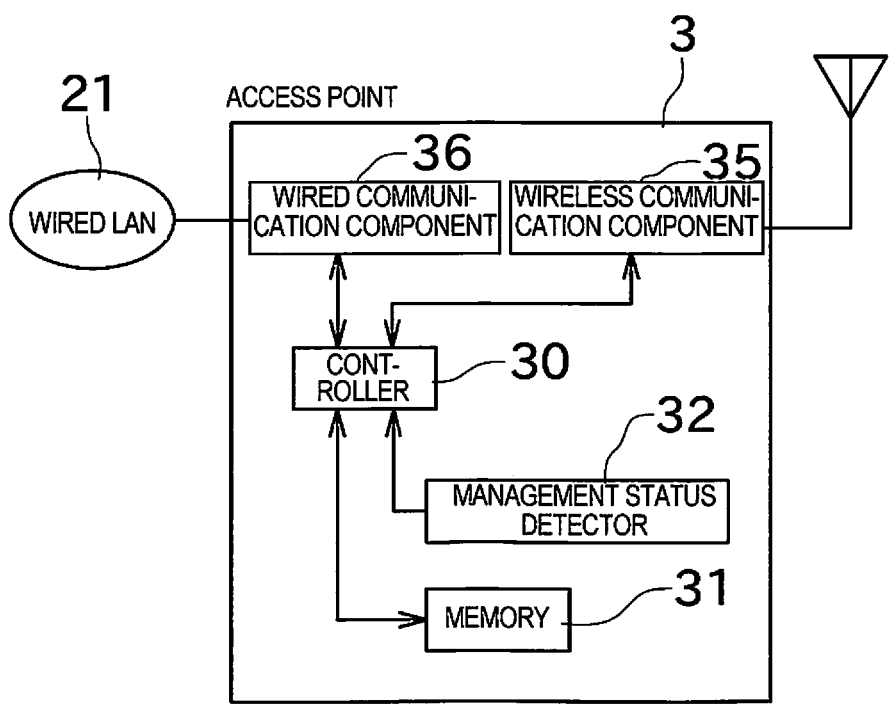
FIG. 2 is a block diagram of the access point in a first embodiment.

FIG. 2 is a block diagram of the configuration of an access point 3. Since the plurality of the access points 3 that make up the wireless LAN 20 all have the same or similar configuration, just one access point 3 is illustrated as an example in FIG. 2.

As shown in FIG. 2, the access point 3 includes a wireless communication component 35 that performs wireless communication with the client 5, and a wired communication component 36 that performs wired communication via the above-mentioned wired LAN 21.

The access point 3 includes a controller 30 that controls the wireless communication component 35, the wired communication component 36, etc. Also, the access point 3 includes a memory 31 for storing various settings for this access point 3. The controller 30 controls the various components of the access point 3 based on the settings stored in the memory 31. The settings stored in the memory 31 will be described below.

An identifier (more specifically, an SSID (service set identifier)) is set for each access point 3. The SSID referred to in this Specification also encompasses an ESSID (extended service set identifier). The SSID set for the access point 3 is stored in the memory 31 of that access point 3. The client 5 attempts to connect to the access point 3 upon designating the desired SSID.

The controller 30 of the access point 3 is configured to be able to perform user authentication of the client 5. Any suitable, known method can be used for user authentication. With the access points 3 in this embodiment, at least WPA2 (Wi-Fi Protected Access 2) enterprise mode and WPA2 home mode can be used as the method of user authentication. WPA2 enterprise mode is a method in which an authentication server 4 is used to perform user authentication. WPA2 home mode is a method in which an encryption key shared by the access point 3 and the client 5 is used to perform user authentication, and is also called personal mode. In WPA2 home mode, there is no need for the authentication server 4 in user authentication.

As shown in FIG. 1, the wireless LAN 20 and the wired LAN 21 of the branch office 11 are connected to a WAN (wide area network) such as the Internet 23 via a relay device 22 (such as an L3 switch). Similarly, the wireless LAN 20 and wired LAN 21 of the main office 10 and the other branch offices 12, 13, and so forth are also connected to the Internet 23. Because of the above, the wireless LAN 20 and the wired LAN 21 created at the main office 10 and the branch offices 11, 12, 13, and so forth are configured to be able to communicate with each other via the Internet 23.

A management device 2 for the central management of the access points 3 is provided at the main office 10. The management device 2 is connected to the wired LAN 21 of the main office 10. The management device 2 is configured to be able to communicate with the access points 3 of the branch offices 11, 12, 13, and so forth via the Internet 23 and the wired LAN 21.

The wired LAN 21 of the main office 10 is connected to the authentication server 4, which is used for user authentication in WPA2 enterprise mode. The access points 3 communicate with the authentication server 4 to perform user authentication in WPA2 enterprise mode. Instead of thus providing the authentication server 4 separately from the management device 2, the management device 2 may also function as the authentication server 4.

As discussed above, when the wireless LANs 20 and the wired LANs 21 of the main office 10 and the branch offices 11, 12, 13, and so forth, which are located apart from one another, are connected to each other, the wireless network system 1 is constituted by the management device 2, the authentication server 4, and the numerous access points 3.

Of the wireless network system 1 configured as above, the portion used by employees (such as government workers) for business is called a "commercial communication network." Usually, only employees are able to access a commercial communication network.

The management device 2 is configured so that it can communicate with the various access points 3 and thereby change the settings of the access points 3, either individually or collectively. The administrator of the wireless network system 1 operates the management device 2 as needed to change the settings of the access points 3 of the branch offices 11, 12, 13, and so forth, which are located apart from each other.

Also, the management device 2 periodically (or non-periodically) communicates with the access points 3 and collects information about the working status of the access points 3. This allows the status of all of the access points 3 to be monitored together at the management device 2.

In addition, the management device 2 communicates periodically or non-periodically with the access points 3 as needed, to manage the wireless network system 1. This communication performed between the access points 3 and the management device 2 for the sake of managing the wireless network system 1 is called "management communication."

The access points 3 are configured so that communication packets can be sent and received to and from other access points 3 or the Internet 23, without going through the management device 2. That is, the management device 2 in this embodiment need not have the function of relaying communication packets sent and received by the access points 3. In this embodiment, the above-mentioned management communication is the only essential part in communication between the management device 2 and the access points 3. Therefore, even if communication should become temporarily impossible between the management device 2 and the access points 3, the access points 3 will still be able to send and receive communication packets to other access points 3 or the Internet 23.

The setting of the access points 3 by the management device 2 will now be described.

The management device 2 can make a wide range of settings in the access points 3. To give an example, the management device 2 in this embodiment can make authentication settings and communication settings for the access points 3. The settings made by the management device 2 are stored in the memory 31 of each access point 3.

Authentication settings are settings related to the method by which the access point 3 subjects the client 5 to user authentication. As discussed above, the access points 3 in this embodiment can use WPA2 enterprise mode and WPA2 home mode for user authentication. Therefore, the management device 2 in this embodiment sets whether to use WPA2 enterprise mode or WPA2 home mode for user authentication, for each access point 3. Each access point 3 subjects the client 5 to user authentication according to the authentication settings made by the management device 2.

Communication settings are various kinds of settings needed for the access point 3 to communicate with a WAN (Internet 23) or the other access points 3. Examples of communication settings include setting a communication path, setting a communication filter (access limitation), setting a firewall, setting a DHCP (dynamic host configuration protocol), and setting an NAT (network address translation) or NAPT (network address port translation). Each access point 3 connects to the Internet 23 or the other access points 3 according to the details of the communication settings made by the management device 2.

FIG. 3 shows a simplified example of what is stored in the memory 31, in the form of a table. What is shown in FIG. 3 is an example used for illustration, and is not intended to limit what is actually stored in the memory 31. What is shown in FIG. 3 is a part of what is stored in the memory 31. Also, what is stored in the memory 31 can be different for each access point 3.

The access points 3 in this embodiment are configured so as to be able to store a plurality of identifiers (SSIDs). These SSIDs can be set by the management device 2. For example, FIG. 3 shows in simplified form how three identifiers (a first SSID, second SSID, and third SSID) are stored in the memory 31 of an access point 3. The "first SSID," "second SSID," "third SSID," and so on are merely names given for the sake of description. As is commonly known, a character string can be set for an SSID.

The management device 2 in this embodiment makes authentication settings and communications for each access point 3, and associates each with an SSID. In the example in FIG. 3, for instance, authentication settings and communications (more specifically, setting a communication filter) are each stored so as to be associated with three SSIDs.

More specifically, a communication filter that performs user authentication in WPA2 enterprise mode and permits connection to the Internet and a commercial communication network is set for the first SSID in the memory 31 shown in FIG. 3. A communication filter that performs user authentication in WPA2 home mode and permits connection to the Internet and a commercial communication network is set for the second SSID. Let us assume that the pass-phrase used for user authentication of the second SSID is known only to employees. Also, a communication filter that performs user authentication in WPA2 home mode and permits connection only to the Internet (prohibits connection to a commercial communication network) is set for the third SSID. Let us assume that the pass-phrase used for user authentication of the third SSID is publicly disclosed.

The access points 3 are configured so that the plurality of SSIDs stored in the memory 31 can be validated and invalidated. The controller 30 of each access point 3 communicates with a client 5 according to the various settings stored in the memory 31 corresponding to the SSID designated by that client, when a valid SSID is designated and the client 5 attempts to connect. If an invalid SSID is designated and the client 5 attempts to connect, the controller 30 refuses communication with that client 5.

For instance, in the example in FIG. 3, if the first SSID is set to "valid," the client 5 can designate the first SSID and connect to the access point 3. In this case, the controller 30 of the access point 3 subjects the client 5 to user authentication in WPA2 enterprise mode according to the authentication settings for the first SSID stored in the memory 31. If the user authentication is successful, the controller 30 permits the client 5 to connect to the Internet 23 and a commercial communication network according to the communication settings stored in the memory 31 (more specifically, the "communication filter" setting).

In the example in FIG. 3, if the second SSID is set to "valid," the client 5 can designate the second SSID and connect to the access point 3. In this case, the controller 30 of the access point 3 subjects the client 5 to user authentication by using the pass-phrase disclosed to employees, in WPA2 home mode according to the authentication settings for the second SSID stored in the memory 31. If the user authentication is successful, the controller 30 permits the client 5 to connect to the Internet 23 and a commercial communication network according to the communication settings stored in the memory 31.

Also, in the example in FIG. 3, if the third SSID is set to "valid," the client 5 can designate the third SSID and connect to the access point 3. In this case, the controller 30 of the access point 3 subjects the client 5 to user authentication by using the publicly disclosed pass-phrase, in WPA2 home mode according to the authentication settings for the third SSID stored in the memory 31. If the user authentication is successful, the controller 30 permits the client 5 to connect to the Internet 23 and a commercial communication network according to the communication settings stored in the memory 31.

In the example in FIG. 3, since the pass-phrase used for user authentication with the third SSID is publicly disclosed, anybody can connect to the access point 3 as long as this third SSID is designated. A state in which anybody can freely use the access point 3 is called, for the sake of convenience in this description, a state in which the access point 3 has been "publicly disclosed." That is, the access point 3 can be publicly disclosed by validating the third SSID in FIG. 3. From the standpoint of security, some kind of access limitation is normally provided when the access point 3 is publicly disclosed. For instance, in the example in FIG. 3, a communication filter (access limitation) is set for the third SSID so that connection to a commercial communication network is prohibited.

Thus, in this embodiment, the configuration is such that a plurality of SSIDs are stored in the access points 3, and different settings (authentication setting and communication setting) can be stored for each SSID. Therefore, the operation of the access points 3 (the method for user authentication, the details of the access limitation, etc.) can be changed by switching the SSID between valid and invalid. Using the proper SSID for a given situation makes the wireless network system 1 more flexible.

The management device 2 is configured so that a plurality of SSIDs stored in the memory 31 of each access point 3 can be set to valid or invalid during normal operation (when the management by the management device 2 is being carried out properly). For instance, in the example in FIG. 3, the first SSID is set to valid, while the second and third SSIDs are set to invalid. Therefore, the client 5 can designate the first SSID and connect to the access point 3 during normal operation, but cannot designate the second SSID or the third SSID and connect to the access point 3. Therefore, in the example in FIG. 3, the access point 3 is not publicly disclosed during normal operation.

The characteristic configuration of this embodiment will now be described.

As discussed above, the wireless network system 1 in this embodiment is assumed to be installed in a government office. This wireless network system 1 preferably can be used as emergency communication infrastructure in the event of a large-scale disaster, for example.

If a large-scale disaster has occurred, it is very likely that an error will occur in the network that prevents connection to the authentication server 4, so that user authentication cannot be performed in WPA2 enterprise mode. Therefore, there will be cases in which an access point 3 set so that user authentication is performed in WPA2 enterprise mode cannot be utilized as communication infrastructure in an emergency.

In view of this, when a large-scale disaster occurs, for example, it is preferable to invalidate the first SSID in FIG. 3, and validate the second SSID, for instance. The second SSID in FIG. 3 is set so that user authentication is performed in WPA2 home mode, so user authentication can be carried out even in a scenario in which the authentication server 4 cannot be used. Also, if a large-scale disaster has occurred, for instance, if the third SSID in FIG. 3 is validated, the access point 3 can be publicly disclosed, so that access point 3 will be helpful to ordinary people as emergency communication infrastructure.

By thus changing the valid/invalid setting of the SSID of the access point 3 in the event of a large-scale disaster, etc., the operation of the access points 3 (the method for user authentication, the details of the access limitation, etc.) can be changed. Consequently, the access points 3 can be effectively utilized in the event of a large-scale disaster, etc.

However, if a large-scale disaster should occur, it is likely that all or part of the network will be cut off, and communication between the management device 2 and the access points 3 will be impossible. In this situation, even if the user attempts to change the valid/invalid setting of the SSIDs of the access points 3, it will be difficult for these setting changes to be done by the management device 2.

In view of this, the access points 3 in this embodiment comprise a management status detector 32 for detecting the management status by the management device 2. The controller 30 of an access point 3 is configured to autonomously change the valid/invalid setting of each SSID according to the detecting result of the management status. The term "autonomously" as used in this Specification means "without requiring management communication with the management device 2."

As a result, if a problem should occur in the management status by the management device 2, such as in the event of a large-scale disaster, the operation of the access points 3 can be changed autonomously. This means that the access points 3 can be properly operated even if a situation arises in which management by the management device 2 cannot be performed, such as in the event of a large-scale disaster.

With the access point 3 in this embodiment, the management status detector 32 monitors the status of the network and the status of management by the management device 2. The management status detector 32 then detects the management status by the management device 2 if the status of the network or the status of management by the management device 2 matches a specific detecting condition. Examples of this detecting condition include the following:

Condition A: A situation in which there is a problem in management communication with the management device 2;

Condition B: A situation in which communication with the management device 2 is impossible;

Condition C: A situation in which the administrator cannot access the management device 2;

Condition D: A situation in which at least a specific number of a plurality of confirmation-use addresses cannot be accessed; and Condition E: A situation in which communication with the default gateway is impossible.

Furthermore, the detecting condition can take into account how long these situations have persisted. For instance, it can be concluded that management by the management device 2 has been interrupted if a situation in which there is a problem in management communication with the management device 2 (condition A) has persisted for at least a specific length of time, or if a situation in which communication with the management device 2 is impossible (condition B) has persisted for at least a specific length of time.

Condition C assumes that it is detected that the administrator cannot perform management with the management device 2, such as when the administrator has suffered a disaster, an accident, or an illness. For example, in the event of a large-scale disaster, if a situation in which the administrator cannot access the management device 2 has persisted for at least a specific length of time, it can be concluded that the administrator has suffered a disaster and cannot operate the management device 2, so management has been interrupted. A case in which management has thus been interrupted by some human cause is also encompassed by "interruption of management."

In the above-mentioned conditions A to C, the interruption of management by the management device 2 is detected based on information related to the management device 2. In contrast, conditions D and E involve detecting the management status by the management device 2 based on information related to a device other than the management device 2.

Specifically, the "confirmation-use address" used in condition D is the address of a confirmation-use device other than the management device 2 (an IP address, a URL, etc.). There are no particular restrictions on the confirmation-use device, as long as it is a device that can be accessed by the access point 3 via the Internet 23. For example, the address of the server of a major international or domestic search engine or the like can serve as a confirmation-use address. The management status detector 32 stores a plurality of these confirmation-use addresses. As long as the network is in good working order, it should be possible to access all (or most of) a plurality of confirmation-use addresses. On the other hand, if some major error has occurred in the network, then it will be impossible to access most (or all) of the confirmation-use addresses. Therefore, if there are at least a specific number of confirmation-use addresses that cannot be accessed, it can be concluded that a major error has occurred in the network, and management by the management device 2 cannot be carried out properly.

Meanwhile, condition E involves detecting the interruption of management by the management device 2 based on whether or not communication with the default gateway is possible. Specifically, if the access point 3 cannot communicate with the default gateway, since the access point 3 is independent from the network, it cannot be managed by the management device 2. Therefore, if the access point 3 cannot communicate with the default gateway, it can be concluded that there is a situation in which management by the management device 2 cannot be performed.

The conditions A to E listed above are examples of the condition for detecting the management status by the management device 2. Any one of the above conditions A to E may serve as the detecting condition. Also, two or more of the conditions A to E may together serve as the detecting condition. Further, other conditions may be considered in place of the above conditions, or in addition to them.

Figure 4:
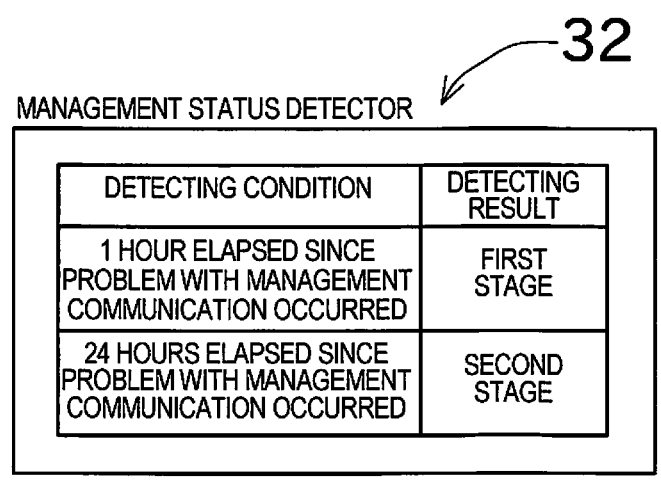
FIG. 4 is a table of the detecting conditions at the management status detector in the first embodiment.

To give an example, detecting conditions at the management status detector 32 in this embodiment are given in the form of a table in FIG. 4. As shown in FIG. 4, the management status detector 32 in this embodiment is set to detect that management by the management device 2 has been interrupted by using the fact that "a situation in which there is a problem in management communication has persisted for one hour" as a detecting condition. The management status detected here is called the "management interruption first stage" for the sake of convenience.

The management status detector 32 in this embodiment is configured so that the management status can be detected at a plurality of stages. For instance, as shown in FIG. 4, the management status detector 32 in this embodiment is set so as to detect a different state from the above-mentioned "management interruption first stage" when "a situation in which there is a problem in management communication has persisted for 24 hours." A management status detected when "a situation in which there is a problem in management communication has persisted for 24 hours" is called the "management interruption second stage" for the sake of convenience.

Thus, the management status detector 32 in this embodiment is configured to detect the management status in two stages, according to whether or not the length of time over which a situation in which management by the management device 2 has been interrupted exceeds a specific length of time (24 hours).

As shown in the example in FIG. 3, how each SSID should be set to valid or invalid, according to the management status detected by the management status detector 32, is stored in the memory 31 of the access point 3. As discussed above, the management status detector 32 in this embodiment detects the management status in a plurality of stages (the management interruption first stage and the management interruption second stage). In view of this, in the example in FIG. 3, how each SSID should be set to valid or invalid is stored for each of the plurality of stages. For example, in FIG. 3, if the "management interruption first stage" is detected, the memory 31 stores settings so that the first SSID is invalid, the second SSID is valid, and the third SSID is invalid. If the "management interruption second stage" is detected, the memory 31 stores settings so that the first SSID is invalid, the second SSID is valid, and the third SSID is valid.

The controller 30 changes whether each SSID is valid or invalid based on what is stored in the memory 31 and the management status detected by the management status detector 32.

The method for controlling the access point 3 configured as above will now be described in specific terms.

During normal operation (when management by the management device 2 is being performed normally), the controller 30 validates the first SSID and invalidates the second SSID and third SSID according to the setting of "normal operation" stored in the memory 31.

If the network should undergo a malfunction due to some kind of large-scale disaster, an error may occur in the management communication between the management device 2 and the access point 3. As illustrated in FIG. 4, if a situation in which there is an error in management communication with the management device 2 persists for one hour, the management status detector 32 detects the "management interruption first stage" (management status detecting step). In this case, the controller 30 invalidates the first SSID and validates the second SSID according to the setting of "first stage" stored in the memory 31 (operation change step).

Specifically, as discussed above, there is a high probability that user authentication cannot be carried out properly by the authentication server 4 in the event of a large-scale disaster. In view of this, if the second SSID is validated as mentioned above, a responsible party (government employee, etc.) can use a disclosed pass-phrase to connect to the access point 3 and use the Internet 23 and a commercial communication network. Therefore, even if the authentication server 4 cannot be used in the event of a large-scale disaster or the like, a responsible party (government employee, etc.) can use the wireless network system 1 as emergency communication infrastructure to perform first response, etc., to the disaster.

As illustrated in FIG. 4, when a situation in which there is an error in management communication with the management device 2 has persisted for 24 hours, the management status detector 32 detects a management interruption second stage (management interruption detecting step). In this case, the controller 30 additionally validates the third SSID according to the setting of "second stage" stored in the memory 31 (operation change step). When the third SSID is thus validated, the access point 3 can be publicly disclosed. Consequently, ordinary people can use the wireless network system 1 as emergency communication infrastructure.

In the above example, in the "management interruption first stage," the access point 3 was not publicly disclosed (the third SSID was not validated). The reason for this is that since it is conceivable that the "management interruption first stage" is a state immediately after a large-scale disaster has occurred (within 24 hours of the disaster), initial response to the disaster by a responsible party (such as a government employee) is given priority. If "management interruption second stage" is applicable (24 hours have elapsed since the disaster), then it is conceivable that the initial response by the responsible party has also settled down, so the access point 3 is publicly disclosed.

Thus, with the configuration in this embodiment, since the management status is detected in a plurality of stages, the validation or invalidation of each SSID can be switched in stages. Consequently, the access point 3 can autonomously change the operation (method of user authentication, details about access limitation, etc.) in stages according to the disaster response situation, etc.

As described above, the access point 3 in this embodiment comprises the controller 30 that controls the operation of the access point 3, and the management status detector 32 that detects the management status by the management device 2. The controller 30 changes the operation of the access point 3 by either validating or invalidating the SSID according to the detecting result of the management status.

Thus, the access point 3 itself detects the management status by the management device 2, and autonomously changes the operation according to the detecting result. Consequently, in the event of a large-scale disaster, for example, if management by the management device 2 should become impossible, the access point 3 can autonomously change the operation to suitably respond to a large-scale disaster or the like.

A modification example of the above embodiment will now be described through reference to FIGS. 5 and 6.

As discussed already in the description of condition D, if "at least a specific number of confirmation-use addresses cannot be accessed," it can be concluded that a major error has occurred in the network. In view of this, as shown in FIG. 6, the management status detector 42 of this modification example is set to detect that a "major network error" has occurred, and that management cannot be properly performed by the management device 2 if "communication with the management device 2 is impossible, and at least a specific number of confirmation-use addresses cannot be accessed."

Meanwhile, even if "communication with the management device is impossible," it can be concluded that the network is in working order if "less than a specific number of confirmation-use addresses cannot be accessed" (i.e., if a number of confirmation-use addresses can be accessed). In this case, it is highly likely that the reason why "communication with the management device 2 is impossible" is malfunction of the management device 2, etc. In view of this, as shown in FIG. 6, the management status detector 42 in this modification example is set to detect a state in which "malfunction of the management device 2" has occurred when "communication with the management device 2 is impossible, and less than a specific number of confirmation-use addresses cannot be accessed."

Thus, the management status detector 42 in this embodiment can detect a plurality of stages of "a state in which a malfunction has occurred in the network" and "a state in which no malfunction has occurred in the network" based on the number of confirmation-use addresses that could not be accessed.

Also, as shown in FIG. 6, the management status detector 42 in this modification example is set to detect that the access point 3 is "independent from the network" and in a state in which management cannot be performed by the management device 2, when "communication with the default gateway is impossible."

FIG. 5 shows an example of what is stored in a memory 41 in this modification example. As shown in FIG. 5, the memory 41 in this modification example stores settings so that the first SSID is set to invalid, the second SSID to valid, and the third SSID to invalid when a state is detected in which "malfunction of the management device 2" has occurred. As shown in FIG. 5, the memory 41 also stores settings so that the first SSID is set to invalid, the second SSID to valid, and the third SSID to valid when a state is detected in which a "major error in the network" has occurred. The memory 41 also stores settings so that all of the SSIDs are set to invalid when a state is detected in which the access point 3 is "independent from the network."

The operation of the access point 3 in this modification example will now be described in specific terms through reference to FIGS. 5 and 6.

During normal operation (when the management by the management device 2 is being performed properly), the controller 30 validates the first SSID and invalidates the second SSID and third SSID according to the setting of "normal operation" stored in the memory 41.

The management status detector 42 in this modification example detects a state in which a "major error in the network" has occurred when "communication with the management device 2 is impossible, and at least a specific number of confirmation-use addresses cannot be accessed." In this case, the controller 30 invalidates the first SSID and validates the second SSID and third SSID according to the setting of "major network error" stored in the memory 41.

Specifically, when a "major network error" has occurred, it is highly likely that a large-scale disaster has occurred domestically. In a case such as this, a responsible party can utilize the access point 3 as emergency communication infrastructure by validating the second SSID. Also, in the event of a large-scale disaster, the access point 3 can be publicly disclosed by validating the third SSID, so that ordinary people can utilize the access point 3 as emergency communication infrastructure.

Meanwhile, the management status detector 42 in this modification example detects a state in which "malfunction of the management device 2" has occurred when "communication with the management device 2 is impossible, and less than a specific number of confirmation-use addresses cannot be accessed." In this case, the controller 30 invalidates the first SSID and validates the second SSID according to the setting of "malfunction of the management device" stored in the memory 41. The third SSID is not validated in this case.

Specifically, even in a situation in which "communication with the management device 2 is impossible," if only the management device 2 is malfunctioning, there will be little need for the access point 3 to be publicly disclosed. In view of this, when it is detected that "malfunction of the management device 2" has occurred, the access point 3 is not publicly disclosed (the third SSID is not validated).

Also, the management status detector 42 in this modification example detects a state in which the access point is "independent from the network" when "communication with the default gateway is impossible." In this case, the controller 30 invalidates all of the SSIDs according to the setting of "independent from the network" stored in the memory 41. The result of all of the SSIDs thus being invalidated is that the client 5 that was connected to the access point 3 is cut off from that access point 3. Consequently, the client 5 is prompted to roam and try to connect to another access point.

As described above, the management status detector 42 in this modification example detects the management status based on the state of communication with a device other than the management device 2 (a confirmation-use device or the default gateway). For instance, if there are at least a specific number of confirmation-use addresses that could not be accessed, a state is detected in which a major error has occurred in the network, and management by the management device 2 cannot be performed properly. Also, in a situation in which communication with the default gateway is impossible, a state is detected in which the access point 3 itself is independent from the network, and management cannot be performed by the management device 2.

Thus, the access point 3 can take into account the state of communication with a device other than the management device 2, and thereby ascertain the status of the network to which it is connected. Consequently, the access point 3 can autonomously perform control according to the status of the network, even in a situation in which management by the management device 2 has been interrupted.

A second embodiment of the present invention will now be described through reference to FIGS. 7 and 8. In the description of this embodiment, those components that are the same as or similar to those in the first embodiment above will be numbered the same, and will not be described again.

Figure 8:
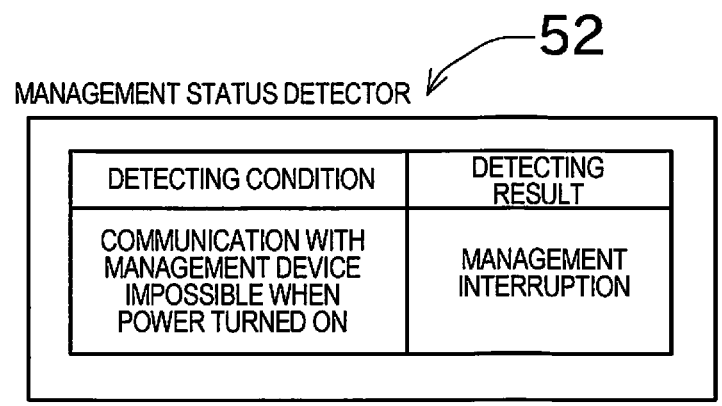
FIG. 8 is a table of the detecting conditions at the management status detector in the second embodiment.

FIG. 8 shows the detecting condition at a management status detector 52 of the access point 3 in this second embodiment. The management status detector 52 in this second embodiment is set to detect the interruption of management on the condition that "communication with the management device 2 is impossible when the power is on."

Therefore, the operation of the access point 3 in this second embodiment is as follows. Specifically, the management status detector 52 in the second embodiment determines whether or not communication with the management device 2 is possible when the user installs the access point 3 and turns on the power. If communication is established, the management status detector 52 determines that management by the management device 2 has not been interrupted. In this case, the controller 30 validates the first SSID and invalidates the second SSID and third SSID according to the setting (FIG. 7) of "normal operation" stored in a memory 51.

In the event of a large-scale disaster or the like that leads to an error in the network, the user operates the device as needed to turn back on the power to the access point 3. The management status detector 52 again determines whether or not communication with the management device 2 is possible when the user turns the power on. The management status detector 52 detects interruption of management if communication with the management device 2 cannot be established. In this case, the controller 30 invalidates the first SSID and validates the second SSID and third SSID according to the setting (FIG. 7) of "during interruption of management" stored in the memory 51.

Thus, the management status detector 52 in the second embodiment detects the management status only when power to the access point 3 has been turned on.

With the above configuration, if a disaster has occurred, the access point 3 can be publicly disclosed merely by turning the power to the access point 3 back on. Also, unless the user has performed the operation of "turning the power on," the management status is not detected by the management status detector 52. Therefore, if the user has no intention to publicly disclose the access point 3, he need only not turn the power back on. This configuration in which the management status is detected only when the user has performed a specific operation makes mis-detecting less likely and reduces the risk that the access point 3 will be operated unintentionally.

Preferred embodiments and modification examples of the present invention were described above, but the above configuration can be changed as follows.

In the description of the embodiment above, a plurality of SSIDs were stored in the memory 31 and each SSID was either validated or invalidated to change the operation of the access point. However, the exact configuration for changing the operation of the access point is not limited to what was given in the embodiment above, and can be suitably modified. For example, even if there is only one kind of SSID stored in the memory 31, a plurality of settings can be readied for that SSID, so that the setting can be switched according to the detecting result of the management status, and this configuration allows the operation of the access point to be changed.

In the above embodiments, the management device 2 was assumed to be in the main office 10, but this is not the only option, and the management device 2 may be installed in the branch office 11, for example.

Not all of the access points 3 that make up the wireless network system 1 need to be the access point of the present invention. The effect of the present invention can be achieved even if only some of the access points 3 that make up the wireless network system 1 are the access point of the present invention.

In the modification example of the first embodiment above, all of the SSIDs were invalidated when the access point 3 cannot communicate with the default gateway (when the access point is independent), but this is not the only option, and the bare minimum of SSID may be left valid.

In the second embodiment above, the operation of "turning on the power" was given as an example of a "specific operation," but the specific operation is not limited to this. For instance, an operation of pressing a specific button provided to the access point 3 may be the "specific operation."

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A wireless access point device, in which authentication settings or communication settings are managed by a management device, the wireless access point device comprising:
    a controller configured to control operation of the wireless access point device; and
    a management status detector configured to detect as a management status whether or not management by the management device has been interrupted,
    the controller being further configured to determine, by connecting to the management device, whether or not to allow a client terminal that has attempted to connect to the wireless access point device to connect to the Internet while the management status detector detects that the management has not been interrupted, and
    the controller being further configured to determine, by itself without connecting to the management device, whether or not to allow the client terminal to connect to the Internet while the management status detector detects that the management has been interrupted.

2. The wireless access point device according to claim 1, wherein
    the controller is further configured to control at least authentication of the client terminal that has attempted to connect to the wireless access point device, and access restriction to the client terminal for which the authentication has been successful, and
    the controller is further configured to change the access restriction to the client terminal according to whether or not the management has been interrupted.

3. The wireless access point device according to claim 1, wherein
    the controller is further configured to make the wireless access point device publicly available according to a detecting result of the management status.

4. The wireless access point device according to claim 1, wherein
the management status detector is further configured to detect the management status in a plurality of stages, and
the controller is further configured to change the operation for each of the plurality of stages.

5. The wireless access point device according to claim 4, wherein
the management status detector is further configured to detect the management status in at least the following three stages:
the management has not been interrupted;
the length of time that the management has been interrupted is less than a specific duration; and
the length of time that the management has been interrupted is at least the specific duration.

6. The wireless access point device according to claim 4, wherein
the management status detector is further configured to detect the management status in at least the following two stages:
a state in which an error has occurred in a network; and
a state in which an error has not occurred in the network.

7. The wireless access point device according to claim 1, wherein
the management status detector is further configured to detect that the management by the management device has been interrupted based on at least one of the following conditions:
a situation in which there is a problem with management communication with the management device;
a situation in which communication with the management device is impossible; and
a situation in which an administrator has no access to the management device.

8. The wireless access point device according to claim 5, wherein
the management status detector is further configured to detect that the management by the management device has been interrupted based on at least one of the following conditions:
a situation in which there is a problem with management communication with the management device;
a situation in which communication with the management device is impossible; and
a situation in which an administrator has no access to the management device.

9. The wireless access point device according to claim 6, wherein
the management status detector is further configured to detect that the management by the management device has been interrupted based on at least one of the following conditions:
a situation in which there is a problem with management communication with the management device;
a situation in which communication with the management device is impossible; and
a situation in which an administrator has no access to the management device.

10. The wireless access point device according to claim 1, wherein
the management status detector is further configured to detect the management status based on a state of communication with a device other than the management device.

11. The wireless access point device according to claim 7, wherein
the management status detector is further configured to detect the management status based on a state of communication with a device other than the management device.

12. The wireless access point device according to claim 8, wherein
the management status detector is further configured to detect the management status based on a state of communication with a device other than the management device.

13. The wireless access point device according to claim 9, wherein
the management status detector is further configured to detect the management status based on a state of communication with a device other than the management device.

14. The wireless access point device according to claim 10, wherein
the management status detector is further configured to store addresses for a plurality of confirmation-use devices, which are devices other than the management device, and
the management status detector is further configured to detect the management status based on a number of addresses with which communication cannot be performed.

15. The wireless access point device according to claim 14, wherein
the controller is further configured to change the operation according to the number of addresses with which communication cannot be performed.

16. The wireless access point device according to claim 1, wherein
the management status detector is further configured to detect whether or not the management has been interrupted based on whether or not communication with is possible, and
the controller is further configured to invalidate authentication as to whether or not to allow the client terminal to connect to the Internet while the communication with the default gateway is impossible.

17. The wireless access point device according to claim 16, wherein
the controller is further configured to cut off communication with the client terminal while the communication with the default gateway is impossible.

18. The wireless access point device according to claim 1, wherein
the management status detector is further configured to detect the management status when a specific operation is performed on the wireless access point device.

19. A wireless network system comprising:
the wireless access point device according to claim 1; and
a management device.

20. A method for controlling a wireless access point device, in which authentication settings or communication settings are managed by a management device, the method comprising:
detecting as a management status whether or not management by the management device has been interrupted; and
changing operation of the wireless access point device according to a detecting result of the management status, the changing of the operation further including
- determining, by connecting to the management device, whether or not to allow a client terminal that has attempted to connect to the wireless access point device to connect to the Internet while detecting that the management has not been interrupted, and
- determining, by itself without connecting to the management device, whether or not to allow the client terminal to connect to the Internet while detecting that the management has been interrupted.

* * * * *